United States Patent [19]

Brown

[11] Patent Number: 5,076,316

[45] Date of Patent: Dec. 31, 1991

[54] FLOW CONTROL VALVE

[76] Inventor: Daniel P. Brown, 8310 127th, Palos Park, Ill. 60464

[21] Appl. No.: 473,215

[22] Filed: Jan. 31, 1990

[51] Int. Cl.⁵ .................... F16K 1/22; F16K 31/52
[52] U.S. Cl. ................................. 137/315; 137/601
[58] Field of Search ............... 137/601, 315; 251/279

[56] References Cited

U.S. PATENT DOCUMENTS

| 3,559,679 | 2/1971 | Smirra | 137/601 X |
| 4,377,181 | 3/1983 | Chan | 137/601 X |
| 4,628,954 | 12/1986 | Dayus | 137/601 X |

FOREIGN PATENT DOCUMENTS 2132318 7/1984 United Kingdom ............... 137/601

Primary Examiner—Stephen M. Hepperle
Attorney, Agent, or Firm—Wood, Phillips, Mason, Recktenwald & VanSanten

[57] ABSTRACT

A flow control valve for selectively opening and obstructing a flow passageway defined by a conduit. The valve has a mounting block, first and second valve wings, each mounted to the block for rotation about parallel axes between open and closed position, and structure for simultaneous moving the first and second valve wings between their open and closed positions. The first and second valve wings are each rotatable oppositely about their respective axes in moving between corresponding open and closed positions.

21 Claims, 2 Drawing Sheets

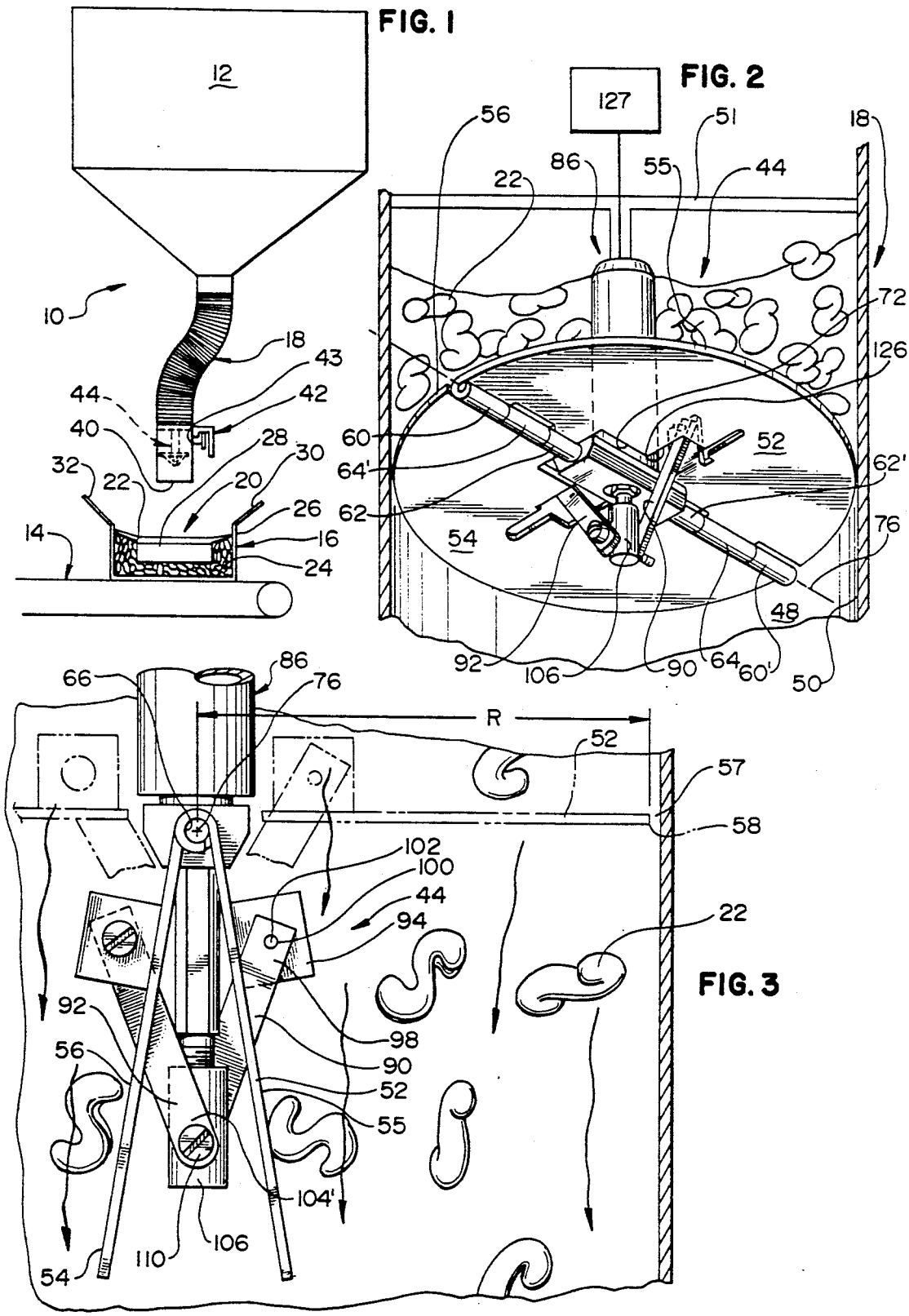

FLOW CONTROL VALVE

BACKGROUND OF THE INVENTION

1. Field of the Invention

This invention relates to valves for the control of mass flow and, more particularly, to a valve having separate first and second valve wings that are selectively movable between open and closed positions.

2. Background Art

There are a multitude of different valve configurations used to control mass flow, such as in the feeding of grains, cereals, packaging materials, etc. While the valve of the present invention is a general purpose valve, which has utility in many different environments, its utility in the packaging field and, more particularly, the loose fill packaging field, will be described herein only as a representative environment.

There are generally two applications for flow control valves in the loose fill industry. One such application is in converting plants in which raw resin beads are expanded in bulk and transported in high volume for processing. Due to the large volume of material being handled in such operations, the conveying conduits and flow control valves therefor are very large. Precise metering and flow control of product is unnecessary.

In a second application, the loose fill is controllably delivered into containers "on-site". These delivery systems are low volume compared to those used in converting plants. On-site loose fill packaging requires that an operator be able to precisely control the direction and quantity of discharged loose fill material.

Loose fill packaging operation- typically gravity feed discrete, expanded polystyrene particles into a container for an article to be shipped. A conduit, depending from a hopper with a bulk supply of the loose fill material has a movable discharge end for controllably directing the loose fill into the container. The operator controls a valve to arrest the feed of loose fill when a desired amount thereof is introduced into the container.

One exemplary valve is similar to that conventionally employed as a damper on a flue pipe. A flat disk is rotatable manually through a 90° range between a closed position, wherein a planar surface n the disk is situated at right angles to the material flow direction and obstructs flow through the pipe, and an open position, wherein the disk planar surface is aligned generally in the flow direction to allow substantially unobstructed flow of the material.

This type of valve has several drawbacks when used in loose fill delivery systems. First, the valve, while capable of being automated, requires a fairly complicated mechanism to accomplish this end.

Another problem with this type of valve is that a significant amount of material is discharged after the valve is closed. As the valve moves from its open position to its closed position, the uppermost part of the valve plate pivots in a downward direction and in so doing sweeps additional conveying material towards the outlet.

Another type of conventional valve is a louver-type valve. This type of valve has limited applicability due to its space requirements and is therefore practical only on a large scale. If the louvers are not wide enough, the individual louvers, even in an open position, significantly obstruct material flow.

Another conventional type of control valve is a sliding gate valve. A gate is guided in translation between open and closed position in a line perpendicular to the flow direction. While this type of valve lends itself to automated operation, the gate mechanism and automating structure therefor take up a considerable amount of space. Generally, the sliding gates are movable outside of the flow space where the actuating structure therefor resides with the valve in an open position. The space demands are obvious.

A further drawback with the sliding gate valve is that the conveying material tends to interfere with the gate as it moves towards its closed position. Material may wedge between the free edge of the gate and the seat therefor as the valve moves towards its closed position.

Another type of valve conventionally used in mass flow operations is a scissors-type valve. The scissors-type valve is difficult to automate. Further, the scissors-type valve is spaced demanding, which makes it impractical in on-site packaging systems.

SUMMARY OF THE INVENTION

The present invention is specifically directed to overcoming the above-enumerated problems in a novel and simple manner.

It is the principal objective of the present invention to provide a simple, lightweight valve mechanism that is compact and precisely controllable.

More particularly, the present invention is concerned with a flow control valve for selectively opening and obstructing a flow passageway defined by a conduit. The valve has a mounting block, first and second valve wings each mounted to the block for rotation about parallel axes between open and closed position, and structure for simultaneously moving the first and second valve wings between their open and closed positions. The first and second valve wings are each rotatable oppositely about their respective axes in moving between corresponding open and closed positions.

Preferably, each of the first and second valve wings has a planar surface to block flow of material with the valve wings in a closed position.

With the above structure, the valve wings can be pivoted simultaneously upwardly from an open to a closed position. With this arrangement, conveying material is intercepted and drawn upwardly by both valve wings moving towards their closed position so that discharge flow is abruptly stopped.

Another object of the invention is to make the valve wing moving structure sufficiently compact that it can be located substantially entirely within the flow passageway within the conduit. In addition to reducing overall system space requirements, the valve is sufficiently light that it will not appreciably burden the operator as the discharge end of the conduit is repositioned during use.

In one form of the invention, the structure for simultaneously moving the valve wings is a rod that is movable reciprocatively in a linear path between extended and retracted positions. The rod is connected to each of the first and second valve wings, preferably through use of pivotably connected links, to effect the requisite movement of the valve wings.

Small profile mechanical, pneumatic, hydraulic cylinders, etc. are commercially available with sufficient rod/piston stroke to effect the desired movement of the valve. The only portion of the valve that need be situated externally of the conduit is the delivery line and control for the operating medium.

The valve wings can be made from sheet material and configured to match the cross section of the conduit passageway. In a preferred form, hinge knuckles are integrally formed with the valve wings with the knuckles on the first and second valve wings intermeshed to define a common hinge pin barrel.

Another aspect of the invention is the provision of structure to facilitate assembly/disassembly of the valve mechanism. A link support block is provided to be threadably engaged with the end of the rod/piston. The link support block pivotably accepts an end of each of the links connecting to the valve wings. The cylinder housing is threadably engaged with the mounting block. The elements are cooperatively arranged so that the cylinder can be threaded into the mounting block simultaneously as the rod/piston end threads into the link support block. In simple reverse operations, the cylinder can be assembled into its in operative position and disassembled from the remainder of the valve.

BRIEF DESCRIPTION OF THE DRAWINGS

FIG. 1 is a side elevation view of an on-site packaging system including a bulk supply of loose fill for feeding through a conduit on which a flow control valve, according to the present invention, is incorporated;

FIG. 2 is an enlarged, fragmentary, section view of the conduit with the inventive flow control valve in a closed/blocking position;

FIG. 3 is a view similar to that in FIG. 2 with the flow control valve in an open position.

DETAILED DESCRIPTION OF THE DRAWINGS

Figure 4:
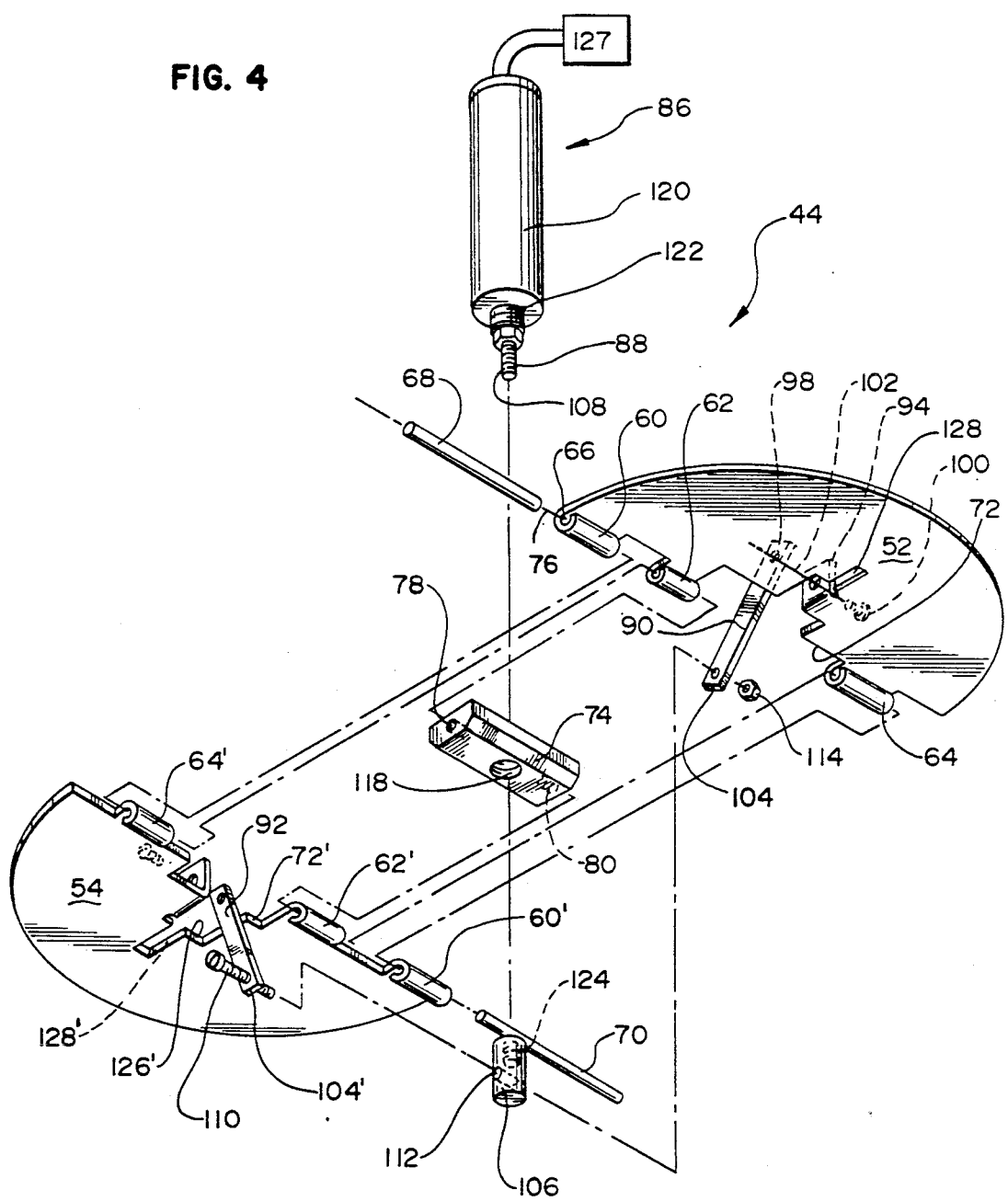
FIG. 4 is an exploded, perspective view of the inventive flow control valve.

In FIG. 1, a representative mass flow system is shown at 10 that is suitable for incorporation of the present invention. As noted above, the present invention is a versatile structure that is usable in virtually an unlimited number of environments—the loose fill industry is but exemplary of one such environment.

FIG. 1 depicts an on-site packaging setup. A loose fill supply hopper 12 is suspended above a conveyor 14 used to advance article containers/cartons 16 one by one into a fill position directly beneath the hopper 12. A flexible conduit 18 is employed to communicate loose fill material from the hopper 12 to the inside 20 of the container 16. The loose fill material consists of discrete particles 22 (FIGS. 2 and 3) which are preferably polystyrene expanded shapes, commonly referred to in the industry as "peanuts".

In a typical packaging procedure, a limited amount of the loose fill particles 22 is initially directed into the empty container 16 to provide a cushion layer on the container bottom wall 24 and around the upstanding peripheral wall 26. The article 28 to be packaged is then placed in the bed of loose fill, after which an additional amount of the loose fill particles 22 is introduced over the article 28. The container flaps 30, 32 (two shown) are closed to effect compression of the loose fill material 22 which resultingly embraces the article 28.

I have invented a novel structure for spraying the conveying particles 22 with an additive/adhesive which tends to bond the particles to each other to control migration of the article 26 through the particles 22 in the container 16. This invention is the subject of three separate, co-pending applications. However, description of the details of that adhesive applying structure is not necessary to understand the present invention.

In operation, the operator of the system in FIG. 1 manipulates the conduit 18 to control the position of the discharge end 40 thereof. Controlled positioning of the conduit discharge end 40 is facilitated by a pistol-type grip 42 fixedly attached near the bottom of the conduit 18. A trigger 43 is carried by the grip 42 and is used to operate the inventive flow control valve 44. The operator can, through the grip 42, position the discharge end 40 where desired and simultaneously operate the trigger 43 with a single finger to move the valve 44 selectively between open and closed positions, as described below with respect to FIGS. 2-4.

The valve 44, as seen in FIGS. 2-4, is movable through the trigger 43 between the closed position shown in FIG. 2, wherein the passageway 48 defined by the inside surface 50 of the conduit 18 is substantially blocked, and an open position, shown in FIG. 3, wherein the particles 22 can flow by gravity freely past the valve 44. The valve 44 is mounted in centered relationship within the conduit 18 by a suitable mounting bracket 51 and resides substantially entirely within the conduit 18.

The valve 44 consists of first and second flat wings 52, 54 respectively with upwardly facing, planar flow blocking surfaces 55, 56. Each valve wing 52, 54 is formed from sheet metal in a generally semi-circular shape of a diameter slightly less than the diameter of the inside surface 50 of the conduit 18. The effective radius R (FIG. 3) of the valve wings 52, 54 is chosen to be slightly less than the radius of the surface 50 so that a slight ga 57 is maintained between the outer edge 58 of the plates 52, 54 and the conduit surface 50 to prevent interference therebetween as the valve wings 52, 54 are repositioned. The gap 57 is selected to be smaller than the dimension of the particles 22 so that the particles 22 will not pass therethrough and discharge with the valve 44 in its closed position. The valve 44 is extremely versatile in that it can be adapted to different conduit diameters by simply selecting wings 52, 54 of appropriate diameter.

The valve wings 52, 54 are identical in construction and, therefore, the description herein will be limited to exemplary valve wing 52. The valve wing 52 has integrally formed knuckles 60, 62, 64 which define a barrel 66 for hinge pins 68, 70. The plate 52 has a rectangular cut-out 72 to accommodate a mounting block 74 into which the hinge pins 68 are inserted to guide the wing 52 in pivoting movement about a horizontal axis 76 between open and closed positions.

To assemble the wings 52, 54 to the mounting block 74, the knuckles 60, 62, 64 are intermeshed with corresponding knuckles 60', 62', 64' on the wing 54, as shown in FIG. 2. The hinge pin 68 extends through knuckles 60, 64', 62 and into a coaxial blind bore 78 in the block 74. The hinge pin 70 extends consecutively through knuckles 60', 64 and 62' and into a blind bore 80 in the mounting block 74 so that the wings 52, 54 are pivotable about the same axis 76. It is not necessary that the valve wings 52, 54 pivot about the same axis, but it is preferred that the axes of pivoting be at least parallel.

The valve wings 52, 54 are moved between open and closed positions by an operating cylinder 86 which has a selectively extendable and retractable piston/rod 88. The cylinder 86 can be operated mechanically, pneumatically, hydraulically, etc. A suitable, commercially available cylinder is sold by Bimba Manufacturing Co. of Monee, Ill. as its Model D-38284-A.

First and second links 90, 92 are provided to operatively connect the piston/rod 88 to the valve wings 52, 54. Again, since both of the valve wings 52, 54 are the same, the connection of the piston/rod 88 will be described with respect to valve wing 52 and link 90.

A tab 94 is struck directly from the first wing 52 and bent at right angles to the plane of the blocking surface 55 on the valve wing 52. One end 98 of the link 90 is pivotably secured to the tab 94 as through a bolt/screw 100 for rotation about an axis 102.

The opposite link end 104 is pivotably secured to a cylindrical block 106, threadably engaged with the end 108 of the piston/rod 88. A single bolt 110 extends through the end 104' of the link 92, a bore 112 in the block 106, and the end 104 of link 90, and is secured by a nut 114.

The piston/rod 88 extends through a vertical bore 118 in the block 74. The housing 120 on the cylinder 86 has a reduced diameter portion 122 that threadably mates within the bore 118 of the mounting block 74. With the cylinder portion 122 fully within the bore 118, the rod end 108 projects below the block 74 sufficiently to accept the link block 106. The block 106 has a threaded bore 124 to mate with the rod end 108.

With the valve 44 assembled, as seen clearly in FIG. 2, the link 90 extends from the block 106 through an extension 126 of the cut-out 72 sufficiently to align with the tab 94. A similar extension 126' is provided in the valve wing 54 to accommodate link 92.

With the valve 44 in the closed position of FIG. 2, the piston/rod 88 can be extended through the operation of a control 127 to its FIG. 3 position. As this occurs, the link ends 104, 104' follow downward movement of the block 106 and in so doing collapse the wings 52, 54 downwardly in opposite directions about the axis 76 into the open position of FIG. 3. It is apparent that the valve 44 readily lends itself to both manual and automatic control.

To allow the valve wings 52, 54 to move closely adjacent to each other in the open position of FIG. 3, to thereby minimize obstruction to flow, elongate cut-outs 128, 128' are provided contiguous with the extensions 126, 126' in the valve wings 52, 54, respectively.

The cylinder 86, mounting block 74, link mounting block 106 and valve wings 52, 54 are relatively dimensioned so that the cylinder part 122 can be engaged with the threads in the bore 118 simultaneously as the rod end 108 engages the threads in the bore 124 and the block 106. This permits one step operative assembly and disassembly of the operating cylinder 106 with the valve wings 52, 54.

It can be seen, by viewing FIGS. 2 and 3, that as the valve 44 is moved from the open position of FIG. 3 to the closed position of FIG. 2, the valve wings 52, 54 simultaneously move upwardly and thereby sweep conveying particles 22 upwardly to abruptly cut off material flow.

In a preferred form, the cylinder 86 is preferably spring biased to the closed position of FIG. 2. If for any reason the cylinder 86 fails, the valve 44 will remain closed.

The foregoing disclosure of specific embodiments is intended to be illustrative of the broad concepts comprehended by the invention.

I claim:

1. A flow control valve for selectively opening and obstructing a passageway defined by a conduit, said valve comprising:
    a mounting block;
    first and second valve wings,
    said valve wings each having opposite sides;
    means for mounting the first valve wing to the mounting block for rotation about a first axis between (a) a closed position wherein flow of matter through a conduit is blocked by said first valve wing and (b) an open position;
    means for mounting the second valve wing to the mounting block for rotation about a second axis that is parallel to the first axis between (a) a closed position wherein flow of matter through a conduit is blocked by said second valve wing and (b) an open position,
    said first and second valve wings each being rotatable oppositely about its respective axis as each of said first and second valve wings is moved from its closed position to its open position; and
    first means for simultaneously moving said first and second valve wings between open and closed positions,
    said first moving means including a rod movable reciprocatively between extended and retracted positions to effect movement of at least one of the first and second valve wings between its open and closed positions,
    said first moving means further including a first link with first and second ends for effecting movement of the one of the first and second valve wings between its open and closed positions as an incident of the rod being moved between its extended and retracted positions,
    there being means for attaching one said link end to the rod on one side of the one valve wing and means for attaching the other link end to the one valve wing on the other side of the one valve wing.

2. The flow control valve according to claim 1 wherein each of said first and second valve wings has a planar surface for blocking flow of matter through a conduit with each said valve wing in a closed position.

3. The flow control valve according to claim 1 wherein said first and second axes are coincident.

4. The flow control valve according to claim 1 wherein said rod is movable reciprocatively in a linear path between its extended and retracted positions.

5. The flow control valve according to claim 1 wherein each said wing is formed from a flat sheet material.

6. The flow control valve according to claim 1 wherein said wings are configured the same to be interchangeable, one with the other.

7. The flow control valve according to claim 1 wherein said first valve wing moving means is hydraulically operated.

8. The flow control valve according to claim 1 wherein said first valve wing moving means is pneumatically operated.

9. The flow control valve according to claim 4 wherein each said valve wing has a substantially planar blocking surface and with the valve wings in their closed position the plane of the blocking surfaces are transverse to the line of the rod path.

10. The flow control valve according to claim 4 wherein said first moving means includes a second link connected to the rod and the other of the valve wings.

11. The flow control valve according to claim 9 wherein the planes of the blocking surfaces are substantially coplanar with each of the valve wings in its closed position and the plane of the blocking surfaces with the valve wings in their closed position in substantially perpendicular to the line of the rod path.

12. The flow control valve according to claim 10 including a means for driving the rod between its extended and retracted positions, a link support block on the rod to which an end of each of said first and second links is attached and the first moving means includes cooperating means on the link support block, the mounting block, the rod and driving means for simultaneously threadably engaging the driving means with the mounting block and the rod to the link support block to thereby removably maintain the rod, driving means, mounting block, first and second links, and link support block in operative relationship.

13. The flow control valve according to claim 10 wherein each said link has spaced first and second ends, means are provided on the first link ends for connecting the first link ends pivotably to the link support block and means are provided for connecting the second link ends, one each, to the first and second valve wings.

14. A flow control valve for a passageway defined by a conduit through which material can move in a flow direction, said valve comprising:
 a mounting block;
 first and second valve wings each having a substantially planar blocking surface;
 means for rotatably mounting the first and second valve wings to the mounting block for selective movement relative to the mounting block between a) a closed position wherein the blocking surfaces significantly obstruct flow through a conduit in which the control valve is located and b) an open position wherein the valve wings are each pivoted from their closed position relative to each other so that material moving in the flow direction in a conduit can flow freely past the blocking surfaces;
 a drive means for the valve wings to selectively move the valve wings between their closed and open positions; and
 cooperating means on the mounting block, valve wings, mounting means and drive means for removably simultaneously a) fixedly mounting the drive means to the mounting block and b) operatively connecting the drive means to the valve wings to cause the valve wings to move between their open and closed positions as the drive means is operated, by rotation of the drive means relative to the mounting block.

15. The flow control valve according to claim 14 wherein said drive means comprises means for simultaneously and selectively moving the valve wings between their open and closed positions.

16. The flow control valve according to claim 15 wherein the blocking surfaces are substantially co-planar in their closed position.

17. The flow control valve according to claim 15 wherein said first and second valve wings are mounted for rotation about first and second parallel axes respectively and said valve wings rotate oppositely about their respective axes in moving between their first open and closed positions.

18. The flow control valve according to claim 15 wherein each said valve wing has an integrally formed knuckle and the knuckles on the first and second valve wings define a barrel for a pin about which the first and second valve wings rotate between their open and closed positions.

19. The flow control valve according to claim 15 wherein the drive means includes a rod that is movable reciprocatively in a linear path between extended and retracted positions and means are provided for connecting the rod to each of the first and second valve wings for moving the first and second valve wings from their closed position to their open position as an incident of the rod moving from one of its extended and retracted positions into the other of its extended and retracted positions and for moving the first and second valve wings from their open position to their closed position as an incident of the rod moving from the other of the extended and retracted positions into the one of the extended and retracted positions.

20. The flow control valve according to claim 19 wherein the means connecting the rod to the valve wings comprises first and second links connecting between the rod and the valve wings.

21. The flow control valve according to claim 20 wherein an end of at least one said link extends fully through one of the valve wings and connects to the one valve wing.

* * * * *